United States Patent [19]
Van Der Werff et al.

[11] Patent Number: 5,978,682
[45] Date of Patent: Nov. 2, 1999

[54] TELECOMMUNICATION SYSTEM

[75] Inventors: Martin Remco Van Der Werff; Johannes Marinus Antonius Camps, both of Groningen; Pieter Gerrit Groeneweg, Zoetermeer; Willem Johannes Helwig, Wassenaar; Paul Bernardus Johannes Oude Vrielink; Sicke Westerdijk, both of Groningen, all of Netherlands

[73] Assignee: Koninklijke KPN N.V., Groningen, Netherlands

[21] Appl. No.: 08/874,616

[22] Filed: Jun. 13, 1997

[30]     Foreign Application Priority Data

Jun. 13, 1996 [NL] Netherlands ................ 1003336

[51] Int. Cl.⁶ .................................................. H04Q 7/20
[52] U.S. Cl. ................................ 455/445; 455/435
[58] Field of Search ..................... 455/445, 456, 455/12.1, 13.1, 524, 525, 437, 435

[56]          References Cited

U.S. PATENT DOCUMENTS

| | | | |
|---|---|---|---|
| 5,095,531 | 3/1992 | Ito .................................. | 455/456 |
| 5,305,466 | 4/1994 | Taketsugu ...................... | 455/445 |
| 5,327,575 | 7/1994 | Menich et al. ................. | 455/437 |
| 5,390,234 | 2/1995 | Bar-Noy et al. ............... | 455/456 |
| 5,408,683 | 4/1995 | Ablay et al. ................... | 455/456 |
| 5,519,758 | 5/1996 | Tabbane ......................... | 455/456 |
| 5,600,704 | 2/1997 | Ahlberg et al. ................ | 455/445 |
| 5,610,969 | 3/1997 | McHenry et al. .............. | 455/435 |
| 5,758,283 | 5/1998 | La Fratta ....................... | 455/435 |
| 5,839,072 | 6/1996 | Chien ............................. | 455/445 |

FOREIGN PATENT DOCUMENTS

| | | |
|---|---|---|
| 0 569 106 A2 | 11/1993 | European Pat. Off. . |
| 0 569 106 A3 | 11/1993 | European Pat. Off. . |
| 0 624 996 A1 | 11/1994 | European Pat. Off. . |

OTHER PUBLICATIONS

S. Madhavapeddy et al; "Adaptive Paging Algorithms for Cellular Systems"; 1995; pp. 976–980; IEEE.

*Primary Examiner*—Dwayne D. Bost
*Assistant Examiner*—Quochien B Vuong
*Attorney, Agent, or Firm*—Frishauf, Holtz, Goodman, Langer & Chick, P.C.

[57]          ABSTRACT

Telecommunication system in which local terminals may be called from one or more central stations by way of transmission paths selected by selection device on the probability of success. Selection takes place with the help of selection tables on the basis of exchanged signalling messages obtained from, or by way of, a switching system (3); other selection tables are also possible, e.g., on the basis of geographic or cartographic information. To the transmission paths there are assigned scores on the basis of the points in time of successful and unsuccessful calls, and of numbers of successful calls. During a session, a call is first made by way of the transmission path having the highest score (S(ok), S(nok) or S(rc)) in one of the selection tables (OK, NOK and RC, respectively). In the event of failure, the call is repeated by way of a preferred transmission path (PP), once again in sequence of the scores from one of the selection tables. If these calls are unsuccessful as well, the other transmission paths are tested, once again in sequence of the scores (S(ok), S(nok) or S(rc)) from one of the selection tables (OK, NOK and RC, respectively). Transmission paths for which it is a short while ago (e.g., less than 5 minutes) that an unsuccessful call took place, are not used. All this is useful, inter alia, for Inmarsat, GSM, UMTS and UPT.

14 Claims, 1 Drawing Sheet

TELECOMMUNICATION SYSTEM

BACKGROUND OF THE INVENTION

The invention relates to a telecommunication system in which local users are capable of being called from one or more central stations by way of transmission paths selected by selection means.

An example of such telecommunication system is a cellular system, such as the GSM system or the future Universal Mobile Telecommunication System (UMTS). The transmission paths comprise base stations which each take care of one local region.

Another example is the current Inmarsat system, in which there are included, in the transmission paths, satellites which each serve one region of the earth's surface.

In this type of system, there is a specific uncertainty as to the location where the users are, and therefore also as to the transmission path which must be chosen to be capable of reaching a user.

In the GSM system, there are routed calls by way of the transmission path which runs by way of the local base station where the user was most recently registered. To minimise the uncertainty regarding the user location, it is necessary that the user call regularly by having his mobile terminal regularly transmit a code. In the event of "pocket telephones", the transmission of such code requires a relatively great deal of battery power, as a result of which the battery must be recharged regularly.

In the Inmarsat system, so far calls are routed to the (four) regions on the basis of the region indicated by the calling party. If a call is unsuccessful, the call is repeated in one, two or three other regions. In practice, all of this turns out to lead to many calls being unsuccessful.

SUMMARY OF THE INVENTION

The object of the invention is to improve the routing of calls by, on the basis of the system signalling, which may be derived from the system, prior to a call to a local user calculating a selection order, according to the probabilities per transmission path that the call is answered by the local user. Thereafter, the local user is called, by way of transmission paths, in descending probability order, until the call is answered.

The invention is suitable for use in transmission systems having mobile terminals, such as Inmarsat, GSM and UMTS, but also for systems, such as the UPT system, in which a user, sequentially or simultaneously, at various terminals, mobile or non-mobile, may choose domicile by having himself registered from there at the system server. In the event of such a system, where the user terminal is logically mobile, the same problem applies regarding the uncertainty of the user location as in systems where terminals are physically mobile.

In accordance with the invention, it is calculated by way of which transmission path the local user may best be called, with the highest probability of success. If a call by the local user is not answered, another transmission path having a lower probability of success is chosen.

The selection order is preferably calculated by means of one or more selection tables which each comprise a designation of the reply probabilities per transmission path. Said selection tables are the result of registrations, in the central stations, of code signals transmitted to, or received from, the local users. The use of various selection tables is based on the insight that the best reply probability is the resultant of an order of various factors which may be derived (inter alia) from the signalling of the transmission system.

A first selection table is formed, e.g., using the recentness of the points in time, registered in the central stations, of code signals which were received from the local user by way of the various transmission paths. From the user, there is received a (signalling) code signal when the user has himself registered in the system, or in response to a call to said user. In either case, the more recent the received code signal, the greater the possibility that the user (still) is in the region which is served by the same transmission path. It is therefore logical, in the event of a new call to the user, to first use the transmission path by way of which a code signal was most recently received from the user.

If, after receipt of a code signal from the user, there is made a call which is not answered, however, it is logical to assume that the user is no longer in the region which is served by the transmission path. The observation that the user does not answer a call by way of a certain transmission path, minimises the probability that a new call by way of that same transmission path will be answered. Said probability, however, grows again as time elapses: if the failure of the call occurred a considerable time ago, a new call again has a fair chance of being answered. In order therefore to be capable of correcting, by negative observations, the positive observations regarding the accessibility of the user, which are ranked in the first selection table, there may be formed a second selection table using the recentness of the points in time registered in the central stations of code signals which were sent to the local user by way of the various transmission paths, but which, as shown by the absence of the receipt, within a certain period of time, of a code signal in response thereto, were not answered by the local user.

The first selection table and the second selection table may be used as each other's opposites: a positive observation erases the effect of an earlier negative observation, while a negative observation annuls the effect of an earlier positive observation. In addition, the effect of each observation decreases as time elapses; in other words, a recent observation prevails over a less recent observation. Combination of both selection tables amplifies the surmise of the region or location where the user is and, by selecting said region or location, increases the probability of a reply.

Still further observations, ranked and laid down in further selection tables, may improve the selection process.

Thus, a third selection table may be formed using the numbers, registered in the central stations, of code signals per transmission path originating from the local user. In this connection, therefore, as a selection criterion there is used the number of times that the user logged on to the system by way of the various transmission paths, either of his own accord or as a result of a call from the system. It is logical to assume that, definitely if further designations are lacking, the probability of a reply to a new call is greatest in a region from which the user has been the most active so far. Incidentally, in this connection, too, it is desirable to assign a greater weight to more recent registrations than to registrations carried out longer ago.

Yet another, fourth selection table may be formed by a table in which for each region the adjacent regions are designated. The logic in the use of said table, as in selecting regions having a good reply probability, is the assumption that a user—if a call is still unsuccessful in one region where the user, as is shown by recent observation, recently was— will then be in an adjacent region. Particularly for large regions, such as in the event of Inmarsat, this is a sound assumption. An extension—which is particularly useful for systems having small regions—is to construct a probable path followed by the user through the regions using consecutive observations, it being possible to obtain the region in which the user will probably be, by extrapolation. During said extrapolation, cartographic data may also be used: there may be taken account of, e.g., the course of roads and the like. In general, therefore, after a call by way of the path having the highest probability score still was unsuccessful, a next call is preferably made by way of a path which, based on logical considerations regarding user movements, has the greatest probability of success. Below, in this connection there will be referred to "preferred transmission paths", with each transmission path having one or more preferred transmission paths.

The various selection tables, which all offer a certain designation with respect to the probability of success, may be combined with one another in various ways and in various orders. During a session, a call is first made by way of the transmission path having the highest score in the first, second or third selection table. In the event of failure, the call may be repeated by way of a preferred transmission path as laid down in the fourth selection table, in sequence of the scores from the first, second or third selection table. Should said calls be unsuccessful as well, the remaining transmission paths are tested, again in sequence of the scores from one of the selection tables. Transmission paths for which it is a short while ago (e.g., less than 5 minutes) that an unsuccessful call took place, are not used. In the next paragraph, several options are discussed.

REFERENCES

BRIEF DESCRIPTION OF THE DRAWING

Below, the invention will be explained in greater detail by reference to FIG. 1, in which the link is shown between a fixed terminal and a mobile terminal, partly by way of the fixed network, partly by way of a satellite link. Furthermore, the construction of the selection order of calls will be discussed by reference to a number of selection tables.

DETAILED DESCRIPTION

Figure 1:
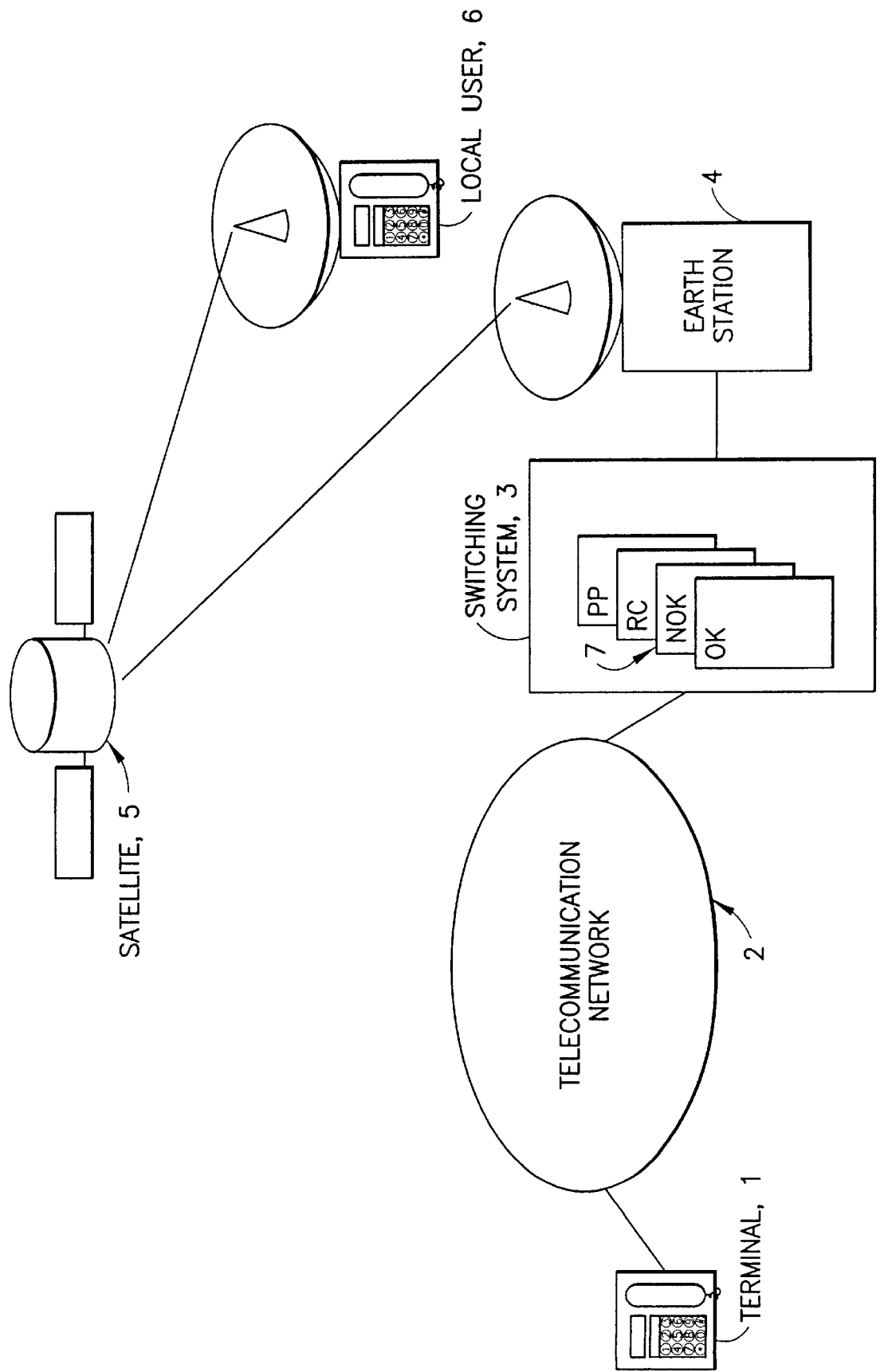

FIG. 1 shows a terminal 1, connected to a telecommunication network 2. By way of an intelligent switching system 3, a call may be made to a mobile user terminal 6 by way of earth stations 4 (one of which is shown in the drawing) and a system of (in the event of Inmarsat four) satellites 5. In the switching system 3, there is chosen, using various data collected there, the transmission path (earth station-satellite) whose probability that the call is answered by the local user 6, is greatest. By way of the switching system 3, the signalling messages (code signals) exchanged between the user terminal 6 and the earth station 4 (by way of the satellites 5) are continuously tapped, and stored in a data base 7. The switching system 3 is capable of receiving and registering and storing the code signals exchanged by all earth stations 6.

In the data base of the switching system 3, per terminal 6, for each transmission path separately there is stored:
OK: the point in time on which a code signal was received from the mobile user terminal 6 for the last time, whether or not in response to a call from the earth station 4;
NOK: the point in time on which, as shown by the failure of a code signal forthcoming from the user terminal 6 in response to a call from the earth station 4, an unsuccessful call was made to the terminal 6 for the last time;
RC: the total number of times that, over a certain period of time, a code signal was received from the terminal. To said value, there may be applied "exponential smoothing", as a result of which the effect of older annotations is reduced, to the benefit of more recent registrations. This may be achieved by periodically dividing the RC value by a constant value >1.

Prior to a new call, said variables are used for calculating a region order relating to the probability of success of said new call. In said calculation, there are also involved the regions which physically adjoin the region in which a successful call took place most recently.

Below, there follow three examples of a calculation of the transmission-path order for four transmission regions. Subsequently, a fourth example will present an identical calculation for a greater number of transmission paths. The meaning of the abbreviations used is:

PN = path number; an * denotes the path having the highest CS(ok) score;
OK = the most recent point in time, counted from t = 0, on which a code signal was received from the user terminal 6;
S(ok) = score based on OK times;
NOK = the point in time on which a call to the terminal was unsuccessful;
S(nok) = score based on NOK times;
CS(ok) = score based on OK times, however corrected using the NOK times;
PP(##) = preferred paths, associated with the path having the highest RS(ok) score;
RC = total responses received per path of the terminal;
S(rc) = score based on RC values;
CPO = calculated path order.

The steps followed are:
1. Rank the paths using the OK times; the more recent the OK times, the higher the score (S(ok)).
2. Investigate for all paths whether the NOK time is shorter than the OK time; in that case the score becomes 0 (CS(ok)).
3. Rank the paths using the NOK times; the longer the NOK times, the higher the score (S(nok)).
4. If after step 2 all scores are equal to 0, the scores (CS(ok)) are made equal to the scores from step 3; otherwise, the score remains as it was determined in steps 1 and 2.
5. Determine the preferred paths (PP(##)) of the path having the highest score.
6. Rank the preferred paths using the numbers of responses received (S(rc)).
7. The calculated path order (CPO) is: the path having the highest score determined in steps 1, 2 and 4, and then the preferred paths, ranked as in step 6.

After the examples below, a similar, yet improved method will be presented.

EXAMPLE 1:

| PN | OK in s. | NOK in s. | RC | S(ok) | S(nok) | CS(ok) |
|---|---|---|---|---|---|---|
| 0 | −446 | −276 | 2 | 2 | 0 | 0 |
| *1 | −111 | −822 | 81 | 3 | 2 | 3 |
| 2 | −481 | −809 | 34 | 1 | 1 | 1 |
| 3 | −853 | −829 | 24 | 0 | 3 | 0 |

-continued

| PP(1) | RC | S(rc) |
|-------|----|----|
| 3 | 24 | 0 |
| 2 | 34 | 1 |

CPO: 1–2–3

The operation is as follows:

From the data base of the switching system 3 there are derived, per terminal 6, for the transmission paths 0 . . . 3, the points in time on which a code signal was received from the user terminal 6 for the last time, either because the terminal 6 was registered by way of said path, or as a reaction to a call by way of that path. The shorter the time elapsed since the terminal emitted a code signal, the greater the probability that the terminal will be accessible by way of the same channel; therefore, the shorter the OK time, the higher the accessibility score shown under S(ok).

From the data base of the switching system 3, there are also derived, per terminal 6, for the transmission paths 0 . . . 3, the points in time on which an unanswered call was made to the user terminal 6 for the last time. The shorter the time elapsed since the terminal evidently was not accessible, the greater the probability that the terminal will not be accessible either by way of the same channel; therefore, the shorter the NOK time, the lower the accessibility score, shown under S(nok).

If for a certain path at a certain moment (OK time) there proved to be contact with the terminal, but thereafter the terminal proved to be no longer accessible (NOK time), the effect of the OK time is annulled by the (more recent) NOK time. The OK scores are thus corrected: the scores S(ok) of the paths for which the absolute value of the NOK time is less than that of the OK time, are set to 0. In the above example, such is the case for path 0, there having been contact with the terminal 446 seconds ago, resulting in an OK score of 2 with respect to the other paths. Since, however, 276 seconds ago, due to an unsuccessful call to the terminal by way of said path 0, the terminal proved no longer accessible by way of path 0, the OK score is returned to 0 (see under CS(ok)). It may occur that in this manner all OK scores must be corrected to 0, as is the case in example 3 below. In this case, the score is determined using the NOK times; after all, the OK times no longer offer any basis for calculating the greatest accessibility probability.

When the terminal 6 is called, the path having the greatest (corrected) score CS(ok)―path 1 in example 1―has the greatest probability of success. In the event, however, that the call still were to be unsuccessful, the call is repeatedly emitted by way of a path which has a special relation to path 1. Thus, it is logical to assume that the terminal, after an unsuccessful call by way of the most probable path 1, or by way of the path which ends in an adjacent region, will be accessible. In example 1, said preferred paths PP(1) of path 1 are the paths 3 and 2.

The order in which said alternative paths 3 and 2 will be used is calculated using the total numbers of (successful) links which in the past have taken place between the switching system 3 and the terminal by way of said paths 3 and 2. Having said this, such order may also be derived from one of the other tables, e.g., the OK table. In the column RC there is shown, for all paths, the total number of links. From this, there prove to have been 24 links by way of path 3, and 34 links by way of path 2. It is logical to assume that the probability of connection by way of path 2 is greater than by way of path 3; path 2 therefore scores higher than path 3.

The calling sequence (CPO) therefore becomes: path 1―path 2―path 3.

EXAMPLE 2:

| PN | OK in s. | NOK in s. | RC | S(ok) | S(nok) | CS(ok) |
|----|------|-------|----|-------|--------|--------|
| 0 | −600 | −667 | 57 | 0 | 2 | 0 |
| 1 | −322 | −227 | 37 | 3 | 1 | 0 |
| 2 | −591 | −202 | 1 | 1 | 0 | 0 |
| *3 | −445 | −922 | 42 | 2 | 3 | 2 |

| PP(3) | RC | S(rc) |
|-------|----|----|
| 1 | 37 | 1 |
| 2 | 1 | 0 |

CPO: 3–1–2

Example 2 shows the result of the calculation method according to the invention for other input variables (OK, NOK, PP(##) and RC). In this example, the highest OK score for path 1 is annulled by an NOK time (−227) which is more recent than the OK time (−322). As a result, to path 3 there is assigned the highest probability of success for a call to the terminal. The preferred paths of path 3 are the paths 1 and 2, of which path 1 in total has the most switching system/terminal links to its credit (37). The call order therefore becomes path 3―path 1―path 2.

EXAMPLE 3:

| PN | OK in s. | NOK in s. | RC | S(ok) | S(nok) | CS(ok) |
|----|------|-------|----|-------|--------|--------|
| 0 | −852 | −305 | 64 | 1 | 2 | 2 |
| *1 | −910 | −894 | 18 | 0 | 3 | 3 |
| 2 | −481 | −293 | 57 | 3 | 1 | 1 |
| 3 | −574 | −261 | 51 | 2 | 0 | 0 |

| PP(1) | RC | S(rc) |
|-------|----|----|
| 2 | 57 | 0 |
| 0 | 64 | 1 |

CPO: 1–0–2

In example 3, the phenomenon occurs that for all four paths the NOK times are more recent than the OK times, as a result of which a score based on the OK times is not possible. In this case, therefore, use is made of the NOK times for determining the path having the greatest chance of success. Based on the NOK times, path 1 receives the highest score (see under S(nok)). Thereafter, the operation again takes place in the same manner: of path 1, the preferred paths are determined (2 and 0) of which the score is then determined on the basis of the RC values. The result is the path order 1-0-2.

Finally, shown below is example 4, generated in the same manner as the previous examples, applied however to a transmission system in which basically links by way of 25 different paths may be set up with the same terminal 6. In this example, it has been taken into account that each path has four preferred paths.

| PN | OK in s. | NOK in s. | RC | S(ok) | S(nok) | CS(ok) |
|---|---|---|---|---|---|---|
| 0 | −486 | −268 | 75 | 13 | 6 | 0 |
| 1 | −809 | −711 | 4 | 4 | 17 | 0 |
| 2 | −861 | −528 | 9 | 2 | 13 | 0 |
| 3 | −116 | −772 | 37 | 23 | 20 | 23 |
| 4 | −981 | −514 | 71 | 1 | 12 | 0 |
| 5 | −378 | −584 | 87 | 16 | 15 | 16 |
| *6 | −8 | −296 | 75 | 25 | 8 | 25 |
| 7 | −691 | −916 | 24 | 9 | 24 | 9 |
| 8 | −447 | −923 | 84 | 14 | 25 | 14 |
| 9 | −221 | −335 | 45 | 19 | 9 | 19 |
| 10 | −409 | −627 | 35 | 15 | 16 | 15 |
| 11 | −592 | −35 | 70 | 11 | 1 | 0 |
| 12 | −128 | −269 | 96 | 22 | 7 | 22 |
| 13 | −524 | −912 | 90 | 12 | 23 | 12 |
| 14 | −723 | −50 | 84 | 7 | 2 | 0 |
| 15 | −729 | −897 | 97 | 6 | 22 | 6 |
| 16 | −218 | −462 | 18 | 20 | 10 | 20 |
| 17 | −47 | −529 | 46 | 24 | 14 | 24 |
| 18 | −808 | −488 | 81 | 5 | 11 | 0 |
| 19 | −841 | −787 | 35 | 3 | 21 | 0 |
| 20 | −368 | −57 | 40 | 17 | 3 | 0 |
| 21 | −633 | −165 | 94 | 10 | 5 | 0 |
| 22 | −227 | −749 | 14 | 18 | 19 | 18 |
| 23 | −996 | −3 | 28 | 0 | 0 | 0 |
| 24 | −178 | −747 | 13 | 21 | 18 | 21 |
| 25 | −698 | −64 | 44 | 8 | 4 | 0 |

| PP(6) | RC | S(rc) |
|---|---|---|
| 2 | 9 | 1 |
| 1 | 4 | 0 |
| 3 | 37 | 2 |
| 5 | 87 | 3 |

CPO: 6–5–3–2–1

Below, there is given a modified method of calculating the path order. The steps thereof are:
1. Rank the paths using the OK times; the more recent the OK times, the higher the score (S(ok)).
2. Of the path having the highest score, determine the preferred paths (PP(##)).
3. Rank the preferred paths using the numbers of responses per path (S(rc)).
Remark: The preferred paths might be ranked once again using the OK times, or possibly using preferences designated by the calling subscriber (this remark also applies to the previous method).
4. Rank the remaining, non-preferred paths using the response numbers (or OK times).
5. Determine whether there are recent NOK times (in the examples below less than 300 s.).
6. The path order then becomes: the path, selected under 1, having the highest OK score; then ranked preferred paths; and finally the non-preferred paths, it being understood that paths having recent NOK times are ruled out. Should all transmission paths be ruled out as a result, the entire procedure is repeated from step 1.

Processing the first example using these steps leads to the following result.

EXAMPLE 4:

| PN | OK in s. | NOK in s. | RC | S(ok) |
|---|---|---|---|---|
| 0 | −446 | −276 | 2 | 2 |
| 1 | −111 | −822 | 81 | 3 |
| 2 | −481 | −809 | 34 | 1 |
| 3 | −853 | −829 | 24 | 0 |

| PP(1) | RC | S(rc) |
|---|---|---|
| 3 | 24 | 0 |
| 2 | 34 | 1 |

CPO: 1–2–3

The operation is as follows.
From the steps 1, 2 and 3, there results an order corresponding to the one from example 1: 1-2-3. A step omitted in the previous examples is step 4, in which the remaining paths are ranked as well. The path order then becomes 1-2-3-0. According to step 5, however, path 0 is ruled out again on account of a recent NOK time <300 s.

Processing the second example in conformity with the second method takes place as follows:

EXAMPLE 5:

| PN | OK in s. | NOK in s. | RC | S(ok) |
|---|---|---|---|---|
| 0 | −600 | −667 | 57 | 0 |
| *1 | −322 | −227 | 37 | 3 |
| 2 | −591 | −202 | 1 | 1 |
| 3 | −445 | −922 | 42 | 2 |

| PP(1) | RC | S(rc) |
|---|---|---|
| 3 | 24 | 0 |
| 2 | 34 | 1 |

CPO: 3–0

From the steps 1, 2 and 3 there follows an order 1-2-3. By means of step 4, path 0 is added. The path order then becomes 1-2-3-0. According to step 5, however, the paths 1 and 2 are ruled out again, on account of a recent NOK time <300 s., so that the order becomes 3-0.

Below, there finally follows yet another example, in which a system having transmission paths 0 . . . 25 calculates the path order according to the second method.

EXAMPLE 6:

| PN | OK in s. | NOK in s. | RC | S(ok) | S(rc) |
|---|---|---|---|---|---|
| 0 | −232 | −167 | 52 | 16 | 12 |
| 1 | −18 | −937 | 4 | 24 | 0 |
| 2 | −447 | −52 | 57 | 9 | 14 |
| 3 | −20 | −205 | 11 | 23 | 2 |
| 4 | −71 | −154 | 76 | 21 | 20 |
| 5 | −49 | −365 | 95 | 22 | 24 |
| 6 | −97 | −801 | 16 | 20 | 5 |
| 7 | −180 | −6 | 65 | 18 | 15 |
| 8 | −326 | −906 | 53 | 14 | 13 |
| 9 | −738 | −963 | 80 | 6 | 22 |
| 10 | −817 | −605 | 42 | 4 | 9 |
| 11 | −378 | −81 | 70 | 13 | 17 |
| 12 | −590 | −147 | 13 | 7 | 3 |
| 13 | −414 | −238 | 96 | 10 | 25 |
| 14 | −582 | −38 | 28 | 8 | 7 |
| 15 | −392 | −602 | 29 | 12 | 8 |
| 16 | −846 | −428 | 7 | 3 | 1 |
| 17 | −924 | −152 | 23 | 1 | 6 |
| *18 | −8 | −753 | 44 | 25 | 10 |
| 19 | −762 | −443 | 14 | 5 | 04 |
| 20 | −968 | −628 | 76 | 0 | 21 |
| 21 | −129 | −619 | 70 | 19 | 18 |

-continued

| 22 | −852 | −982 | 70 | 2  | 19 |
|----|------|------|----|----|----|
| 23 | −296 | −683 | 68 | 15 | 16 |
| 24 | −219 | −454 | 46 | 17 | 11 |
| 25 | −408 | −8   | 89 | 11 | 23 |

| PP(18) | RC | S(rc) |
|--------|----|----|
| 11 | 70 | 1 |
| 25 | 89 | 2 |
| 14 | 28 | 0 |
| 13 | 96 | 3 |

CPO': 18 13 25 11 14 5 9 20 4 22 21 23 7 2 8 0 24 10 15 14 17 6 19 12 3 16 1
CPO": 18 x x x x 5 9 20 x 22 21 23 x x 8 0 24 10 15 14 x 6 19 x x 16 1
CPO: 18 5 9 20 22 21 23 8 0 24 10 15 14 6 19 16 1

First, the calculated order (CPO') is shown without taking the NOK times into account; subsequently (CPO"), the paths whose NOK times are <300 s. are ruled out from selection ("x"); and finally the resulting order is presented (CPO).

The various examples for this application were generated with the help of a GWBASIC program whose source code is shown in Table 1.

TABLE

```
100 REM SAVE"PN.BS", A
110 CLS : KEY OFF
120 OK = 1: NOK = 0: MAX.PATH = 50
130 DIM TIME(1, MAX.PATH), SCORE(1, MAX.PATH), CORRECTED.SCORE(2,
MAX.PATH), PREFERRED.PATH(MAX.PATH, MAX.PATH),
RECEIVED.CODES(MAX.PATH), RANKED.SCORE(1, MAX.PATH),
PREFERRED.PATH$(MAX.PATH, MAX.PATH), MARK$(MAX.PATH),
PREF.SCORE(MAX.PATH), PREF.PATH$(MAX.PATH), NOPRINT(MAX.PATH)
140 '---INPUT NUMBER OF PATHS--------------------------150 OPEN "PN.OP"
FOR OUTPUT AS #1: LOCATE 1, 1: PRINT #1, STRING$(70, ""):LAST.PATH(0) =
LAST.PATH: LOCATE 1, 1: INPUT "Paths 0 . . . ", LAST.PATH$: LAST.PATH =
VAL(LAST.PATH$)
160 IF LAST.PATH$ = ""THEN LAST.PATH = LAST.PATH(0)
170 PREF.PATH = INT(LAST.PATH / 2): IF PREF.PATH > 3 THEN PREF.PATH = 3
180 IF LAST.PATH$ = "0"THEN CLOSE: CLS : END
190 '---RESET VARIABLES-----------------------------200RANKED.SCORE = 0;
CORRECTED.SCORES = 0: RANKED.SCORE.MAX = 0
210 FOR PATH = 0 TO LAST.PATH
220 RANKED.SCORE(OK, PATH) = 0
230 PREF.SCORE(PATH) = 0
240 NEXT PATH
250 '---GENERATE INPUT DATA-------------------------------
260 RANDOMIZE TIMER
270 FOR PATH = 0 TO LAST.PATH
280 TIME(OK, PATH) = −INT(RND * 1000) + 1
290 TIME(NOK, PATH) = −INT(RND * 1000) + 1
300 NEXT PATH
310 IF LAST.PATH$ = ""GOTO 460
320 FOR PATH = 0 TO LAST.PATH
330 RECEIVED.CODES(PATH) = INT(RND * 100) + 1
340 NEXT PATH
350 IF LAST.PATH$ = ""GOTO 460
360 FOR PATH = 0 TO LAST.PATH
370 FOR X = 0 TO PREF.PATH
380 PREFERRED.PATH(PATH, X) = INT(RND * (LAST.PATH + 1))
390 FOR Y = 0 TO PREF.PATH
400 IF (X <> Y) AND (PREFERRED.PATH(PATH, X) = PREFERRED.PATH(PATH, Y))
GOTO 380
410 IF PREFERRED.PATH(PATH, X) = PATH GOTO 380
420 NEXT Y
430 PREFERRED.PATH$(PATH, X) = MID$(STR$(PREFERRED.PATH(PATH, X)), 2): IF
(LAST.PATH >= 10) AND (PREFERRED.PATH(PATH, X) < 10) THEN
PREFERRED.PATH$(PATH, X) = ""+ PREFERRED.PATH$(PATH, X)
440 NEXT X
450 NEXT PATH
460 '---CALCULATE OK-SCORE USING POSITIVE RESPONSE DATA----------470 FOR
PATH = 0 TO LAST.PATH
480 SCORE(OK, PATH) = 0
490 FOR X = 0 TO LAST.PATH
500 IF TIME(OK, PATH) > TIME(OK, (PATH + X) MOD (LAST.PATH + 1)) THEN
```

TABLE-continued

```
SCORE(OK, PATH) = SCORE(OK, PATH) + 1
510 NEXT X
520 NEXT PATH
530 'GOTO 640
540 '---CALCULATE NOK-SCORE USING NEGATIVE RESPONSE DATA----------
550 FOR PATH = 0 TO LAST.PATH
560 SCORE(NOK, PATH) = 0
570 FOR X = 0 TO LAST.PATH
580 IF TIME(NOK, PATH) < TIME(NOK, (PATH + X) MOD (LAST.PATH + 1)) THEN
SCORE(NOK, PATH) = SCORE(NOK, PATH) + 1
590 NEXT X
600 NEXT PATH
610 '---CORRECT OK-SCORE USING NEGATIVE RESPONSE DATA-----------620 FOR
PATH = 0 TO LAST.PATH
630 'IF TIME(OK, PATH) < TIME(NOK, PATH) THEN CORRECTED.SCORE(OK, PATH) =
0: ELSE CORRECTED.SCORE(OK, PATH) = SCORE(OK, PATH)
640 NEXT PATH
650 '---RE-RANK CORRECTED SCORE AND CALCULATE HIGHEST SCORE-------
660 FOR PATH = 0 TO LAST.PATH
670 'MARK$(PATH) = ""
680 FOR X = 0 TO LAST.PATH
690 CORRECTED.SCORE(OK, PATH) = SCORE(OK, PATH)
700 IF CORRECTED.SCORE(OK, PATH) > CORRECTED.SCORE(OK, (PATH + X) MOD
(LAST.PATH + 1)) THEN RANKED.SCORE(OK, PATH) = RANKED.SCORE(OK, PATH) +
710 IF CORRECTED.SCORE(OK, PATH) = 0 THEN RANKED.SCORE(OK, PATH) =
RANKED.SCORE: RANKED.SCORE = RANKED.SCORE + 1: GOTO 730
720 NEXT X
730 CORRECTED.SCORES = CORRECTED.SCORES + CORRECTED.SCORE(OK, PATH)
740 IF RANKED.SCORE(OK, PATH) > RANKED.SCORE.MAX THEN RANKED.SCORE.MAX
= RANKED.SCORE(OK, PATH)
750 NEXT PATH
760 FOR PATH = 0 TO LAST.PATH
770 IF CORRECTED.SCORES = 0 THEN CORRECTED.SCORE(OK, PATH) = SCORE(NOK,
PATH): RANKED.SCORE(OK, PATH) = SCORE(NOK, PATH)
780 'IF RANKED.SCORE(OK, PATH) = LAST.PATH THEN SELECTED.PATH = PATH
790 IF RANKED.SCORE(OK, PATH) = RANKED.SCORE.MAX THEN SELECTED.PATH =
PATH
800 NEXT PATH
810 '---RANK FOR NUMBER OF RECEIVED RESPONSES OF PREFERRED PATH OF
SELECTED PATH
820 FOR PATH = 0 TO PREF.PATH
830 PREF.SCORE(PATH) = 0
840 FOR X = 0 TO PREF.PATH
850 IF RECEIVED.CODES(PREFERRED.PATH(SELECTED.PATH, PATH)) >
RECEIVED.CODES(PREFERRED.PATH(SELECTED.PATH, X)) THEN PREF.SCORE(PATH) =
PREF.SCORE(PATH) + 1
860 NEXT X
870 PREF.PATH$(PREF.SCORE(PATH)) = PREFERRED.PATH$(SELECTED.PATH, PATH)
880 NEXT PATH
890 '---DISPLAY RESULTS------------------------------
900 CLS
910 PRINT #1, "": PRINT #1, USING " PN    OK   S(ok)   NOK   S(nok)   CS(ok)
PP(##) RC "; SELECTED.PATH
920 FOR PATH = 0 TO LAST.PATH
930 IF PREFERRED.PATH$(SELECTED.PATH, PATH) = "" THEN
PREFERRED.PATH$(SELECTED.PATH, PATH) = STRING $((LOG(LAST.PATH) / LOG( 10) +
.5), ""
940 IF PREFERRED.PATH$(SELECTED.PATH, PATH) = "" THEN
PREFERRED.PATH $(SELECTED.PATH, PATH) = STRING $((LOG(LAST.PATH) / LOG(10) +
950 IF PATH = SELECTED.PATH THEN MARK$(PATH) = "*": ELSE MARK$(PATH) = "
960 PRINT #1, USING "&##    +###s.  ##  +###s. ##    ##   &    ###";
MARK$(PATH); PATH; TIME(OK, PATH); SCORE(OK, PATH); TIME(NOK, PATH);
SCORE(NOK, PATH); CORRECTED.SCORE(OK, PATH);
PREFERRED.PATH$(SELECTED.PATH, PATH); RECEIVED.CODES(PATH)
970 NEXT PATH
980 PRINT #1, "": PRINT #1, USING "PP(##) RC    S(rc)"; SELECTED.PATH
990 FOR PATH = 0 TO PREF.PATH
1000 PRINT #1, USING " &     ##    ##"; PREFERRED.PATH$(SELECTED.PATH,
PATH); RECEIVED.CODES(PREFERRED.PATH(SELECTED.PATH, PATH));
PREF.SCORE(PATH)
1010 NEXT PATH
1020 PRINT #1, : PRINT #1, USING "CPO(1): ##"; SELECTED.PATH;
1030 FOR PATH = PREF.PATH TO 0 STEP -1
1040 PRINT #1, ; VAL(PREF.PATH$(PATH));
1050 NEXT PATH
1060 FOR X = LAST.PATH TO 0 STEP -1
1070 FORPATH = 0 TO LAST.PATH
1080 IF PATH = SELECTED.PATH THEN NOPRINT(PATH) = 1
1090 FOR Y = PREF.PATH TO 0 STEP -1
```

TABLE-continued

```
1100 IF VAL(PREF.PATH$(Y)) = PATH THEN NOPRINT(PATH) = 1
1110 NEXT Y
1120 IF (SCORE(OK, PATH) = X) AND (NOPRINT(PATH) = O) THEN PRINT #1,; PATH;
1130 NEXT PATH
1140 NEXT X
1150 PRINT #1,
1160 IF TIME(NOK, SELECTED.PATH) >-300 THEN PRINT #1, "CPO(2): x "; : ELSE
PRINT #1, "CPO(2): "; STR$(SELECTED.PATH); "";
1170 FOR PATH = PREF.PATH TO 0 STEP -1
1180 IF TIME(NOK, VAL(PREF.PATH$(PATH))) >-300 THEN PRINT #1, "x "; : ELSE
PRINT #1, ; PREF.PATH$(PATH); "";
1190 NEXT PATH
1200 FOR X = LAST.PATH TO 0 STEP -1
1210 FOR PATH = 0 TO LAST.PATH
1220 IF PATH = SELECTED.PATH THEN NOPRINT(PATH) = 1
1230 FOR Y = PREF.PATH TO 0 STEP -1
1240 IF VAL(PREF.PATH$(Y)) = PATH THEN NOPRINT(PATH) = 1
1250 NEXT Y
1260 IF (TIME(NOK, PATH) > -300) AND (SCORE(OK, PATH) = X) AND
(NOPRINT(PATH) = 0) THEN PRINT #1, "x"; : ELSE IF (SCORE(OK, PATH) = X) AND
(NOPRINT(PATH) = 0) THEN PRINT #1, ; STR$(PATH);
1270 NEXT PATH
1280 NEXT X
1290 PRINT #1,
1300 PRINT #1, "CPO(3): "; : IF TIME(NOK, SELECTED.PATH) < -300 THEN PRINT #1,
STR$(SELECTED.PATH); "";
131 FORPATH = PREF.PATH TO 0 STEP -1
1320 IF TIME(NOK, VAL(PREF.PATH$(PATH))) < -300 THEN PRINT #1,;
PREF.PATH$(PATH); "";
1330 NEXT PATH
1340 FOR X = LAST.PATH TO 0 STEP -1
1350 FOR PATH = 0 TO LAST.PATH
1360 IF PATH = SELECTED.PATH THEN NOPRINT(PATH) = 1
1370 FOR Y = PREF.PATH TO 0 STEP -1
1380 IF VAL(PREF.PATH$(Y)) = PATH THEN NOPRINT(PATH) = 1
1390 NEXT Y
1400 IF (TIME(NOK, PATH) < -300) AND (SCORE(OK, PATH) = X) AND
(NOPRINT(PATH) = 0) THEN PRINT #1, ; STR$(PATH);
1410 NEXT PATH
1420 NEXT X
1430 CLOSE
```

We claim:

1. A telecommunication method for a system in which a local user is capable of being called from at least one central station by way of transmission paths selected by a selection device, said method comprising the steps of:

calculating a selection order prior to a call to the local user, in accordance with probabilities per transmission path that the call will be answered by the local user, by processing at least one selection table comprising a designation of reply probabilities per transmission path, and thereafter selecting the transmission paths in conformity with the calculated selection order, until the call is answered by the local users, wherein said at least one selection table comprises at least: (i) a first selection table formed as a result of a processing of registrations, in at least one said central station, of code signals received from the local user, including points in time thereof, and (ii) a second selection table including points in time at which code signals were transmitted to the local user by way of the transmission paths, but which, as shown by a lack of receipt of a code signal from the local user in response thereto, remained unanswered by the local user.

2. A telecommunication method according to claim 1, wherein said first selection table includes points in time at which code signals were received from the local user by way of the transmission paths.

3. A telecommunication method according to claim 2, further comprising the step of assigning a score to each transmission path in accordance with said points in time at which code signals were received from the local user such that a more recent point in time at which a code signal was received from the local user receives a higher score.

4. A telecommunication method according to claim 1, further comprising the step of assigning a score to each transmission path in accordance with said points in time at which code signals remained unanswered by the local user such that a more recent point in time at which a code signal remained unanswered by the local user receives a lower score.

5. A telecommunication method according to claim 1, wherein said at least one selection table may comprise a third selection table having a designation of a number of code signals received from the local user per transmission path.

6. A telecommunication method according to claim 5, wherein the number of code signals received from the local user is lowered as a function of time.

7. A telecommunication method according to claim 5, further comprising the step of assigning a score to each transmission path in accordance with said number of code signals received from the local user such that a greater number of code signals received from the local user receives a higher score.

8. A telecommunication method according to claim 1, wherein said at least one selection table may comprise a fourth selection table having preferred transmission paths per transmission path.

9. A telecommunication method according to claim 8, wherein said fourth selection is formed based on one of:

(a) cartographic information, and (b) other geographic information.

10. A telecommunication method according to any one of claim 3, 4, 7 or 8, further comprising the step of using, as a first transmission path for calling the local user, a selected one of the transmission paths which has a highest score.

11. A telecommunication method according to claim 10, further comprising the step of, in an event of failure of a call by way of the first transmission path, repeating said call by way of at least one of the preferred transmission paths in said fourth selection table which is associated with said first transmission path.

12. A telecommunication method according to claim 11, further comprising the step of repeating the call by way of one of the preferred transmission paths in said fourth selection table in a sequence corresponding to the scores of the preferred transmission paths with respect to one of the first, second and third selection tables.

13. A telecommunication method according to claim 11, further comprising the step of, in an event of the call by way of the preferred transmission paths in said fourth selection table also being unsuccessful, repeating the call by way of a remaining one of the transmission paths in accordance with a sequence corresponding to the scores of the remaining transmission paths with respect to one of the first, second and third selection tables.

14. A telecommunication method according to claim 10, further comprising the step of ruling out respective ones of the transmission paths for which the first selection table includes points in time at which code signals were received from the local user shorter than a specific threshold value time.

* * * * *